INVENTOR.
Rolland B. Wallis
BY
Donald P. Selvecki
His Attorney

Jan. 23, 1968 R. B. WALLIS 3,365,203
ROLLING TYPE DIAPHRAGM TYPE SEAL INCLUDING
ORIENTED REINFORCEMENT
Filed July 26, 1965 2 Sheets-Sheet 2

INVENTOR.
Rolland B. Wallis
BY
Donald P. Selvecki
His Attorney

3,365,203
ROLLING TYPE DIAPHRAGM TYPE SEAL INCLUDING ORIENTED REINFORCEMENT
Rolland B. Wallis, La Grange Park, Ill., assignor to General Motors Corporation, Detroit, Mich., a corporation of Delaware
Filed July 26, 1965, Ser. No. 474,803
1 Claim. (Cl. 277—208)

ABSTRACT OF THE DISCLOSURE

A rolling type diaphragm type seal including oriented reinforcement which is radially deformable and axially restrained. The rolling diaphragm type seal is adapted to be rolled back upon itself from one direction by a partially radially deformable end which is contained in another portion, said seal being axially restrained throughout its length.

---

This invention relates to rolling diaphragm seals and more particularly to a seal having longitudinal reinforcing members.

Rolling diaphragm seals are generally made either of homogeneous elastomeric materials or of cloth reinforced elastomeric materials. The homogeneous materials are characterized by their ability to operate for long periods at high cyclic speeds, but eventually fail due to creep of the material resulting from the combination of stress, time and temperature.

Cloth reinforced rolling diaphragms overcome the creep failures but sacrifice the flexibility and high cyclic speed capability of the homogeneous elastomers due to the internal friction between the reinforcing fibers. It is desirable to have a seal with axial tensile reinforcing, free of circumferential restraint. During stroking of such seals, a diametral change occurs which could not be accommodated with hoop type reinforcement.

It is an object of the present invention to provide an improved rolling diaphragm type seal which is radially deformable and axially restrained.

It is still another object of the present invention to provide an improved rolling diaphragm type seal that is adapted to be rolled back on itself from one direction by a partially radially deformable end which is radially contained in another portion, said seal being axially restrained throughout its length.

It is a further object of the present invention to provide an improved rolling diaphragm type seal which is composed of a pair of tubular elastomeric elements, one fitting within the other thereby containing a reinforcing material between the inner periphery of one and the outer periphery of another, said seal when assembled being compressible to form a fused unitary seal.

Further objects and advantages of the present invention will be apparent from the following description, reference being had to the accompanying drawings wherein a preferred embodiment of the present invention is clearly shown.

Figure 1:
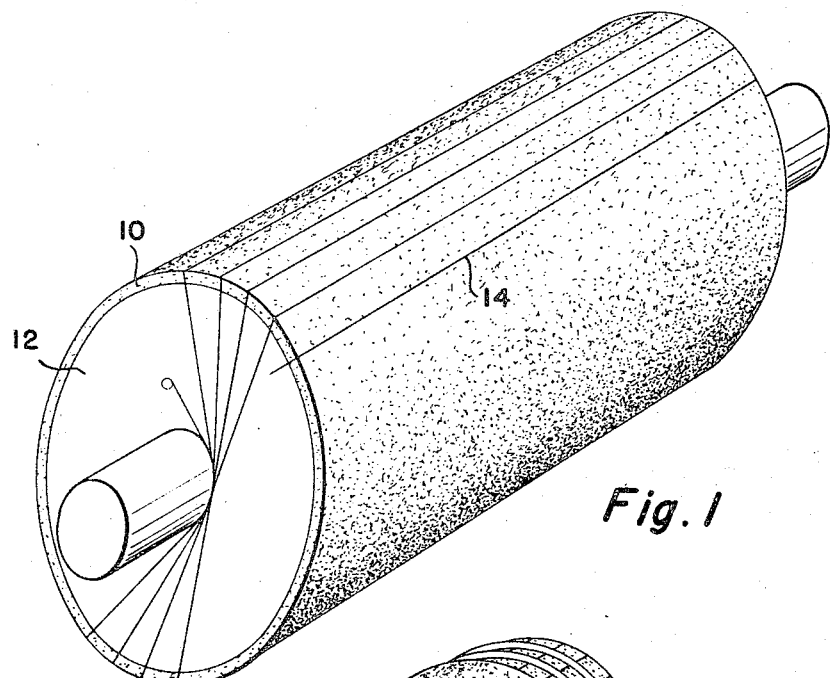
FIGURE 1 is a perspective view of the subject invention during one stage of construction.
Figure 2:
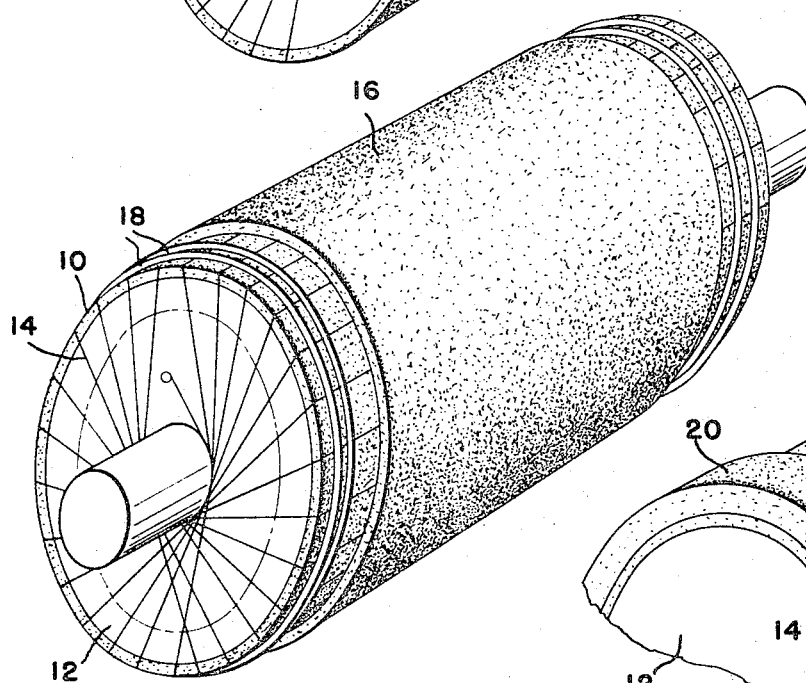
FIGURE 2 is a perspective view of the subject invention at a later stage of construction.
Figure 3:
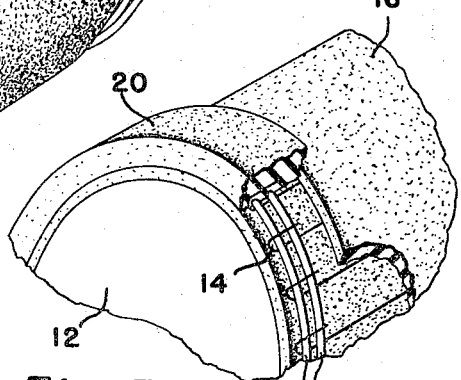
FIGURE 3 is a partial perspective view of the subject invention illustrating a method of construction of a portion of the subject invention.

Referring to FIGURE 1, a substantially tubular portion 10 of elastomeric material is shown operatively positioned on a mandrel 12. Elongated supports 14 are shown longitudinally positioned on portion 10 with respect to the outer periphery of tubular portion 10. Support members 14 are reinforcing filaments designed to prevent axial movement of the elastomeric material while allowing the necessary amount of radial deformation thereof. Referring to FIGURE 2, elongated filaments 14 are shown spaced in parallel fashion on the outer periphery of portion 10 and maintained in their operative position thereon by second elastomeric member 16 also of tubular shape. Hoop-shaped support members 18 are circumferentially disposed near the ends of tubular-shaped elastomeric portions 10. The hoops 18 can be restrained by an elastomeric loop 20 and can be further restrained by trimmed elongated support members 14 lapped over hoops 18 as seen in FIGURE 3. It should be noted that support members 18 are optional in the construction of the seal and, if used on a rolling type diaphragm seal, would normally be disposed on the end of the seal that remained fixed.

Figure 4:
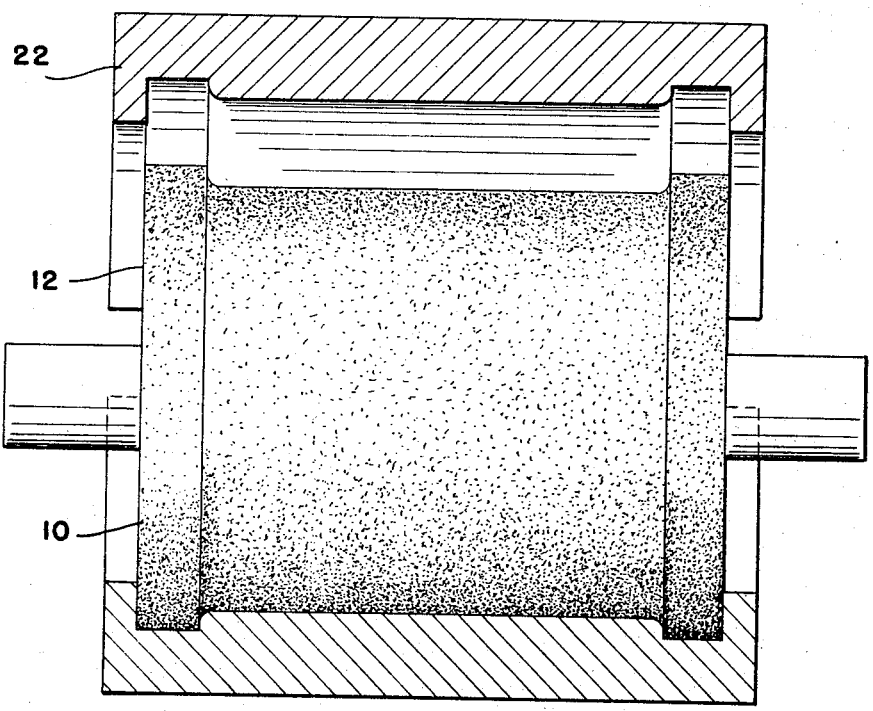
FIGURE 4 is a partial sectional view of the subject invention shown in a typical compressing device.
Figure 6:
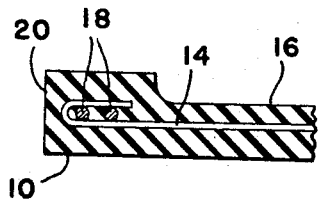
FIGURE 6 is a sectional view taken along line 6—6 of FIGURE 5.
Figure 5:
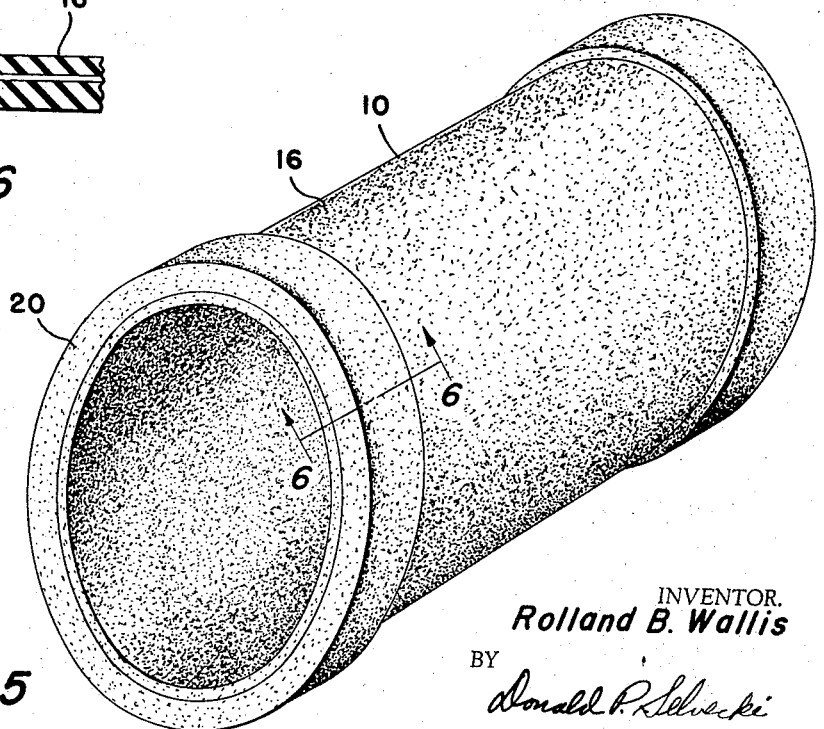
FIGURE 5 is a perspective view of the subject invention illustrated in the completed state.

Referring to FIGURE 6, a section is taken through the elastomeric lug 20 to illustrate the relationship of hoops 18 to the members 14 after portion 10, lug 20 and portion 16 have been fused together by compression to form a unitary structure. FIGURE 4 illustrates a typical compression mold 22 arranged to put high pressure on the assembled seal to bring about the fusion of the elastomeric portions 10 and 16, and lug 20 if used in a particular construction.

The seal has particular utility in an environment where part of the seal is adapted to roll back on itself but creeping of the material is necessarily avoided. It is clear that an elastomeric sleeve or tubular-shaped member will elongate after continued flexing, thereby destroying the dimensional accuracy of the seal and eventually causing a break therein. The elongated support members completely contained within the fused structure prevent elongation after continued flexing, thereby forestalling material creep and subsequent breakdown of the material. The addition of the hoops 18 is optional in the construction of the seal and serves to maintain the fixed diameter of the seal when this portion of the seal is subjected to high stress. Therefore, a seal is constructed which is radially yieldable and axially rigid. In addition, the radial yieldability can be controlled, when desired, in a given installation to provide maximum seal life.

In addition to the article of manufacture disclosed herein, one method of manufacturing this article is hereinafter described. A mandrel is provided equal to the dimension of the interior portion of the seal. An uncured elastomer is placed on the periphery of the mandrel in juxtaposition thereto, thereby forming a sleeve or tubular member. Next, elongated filaments, for example, metal or synthetic material, are wound on the outer portion of the elastomeric sleeve in a manner parallel to the longitudinal axis of the sleeve. Sufficient elongated supports are provided to give the particular seal design strength characateristics desired in a given installation. The portion of the elongated members passing over the open ends of the sleeve are then trimmed to a desired length depending on whether or not hoops are to be used in the particular construction.

If hoops are to be used, such as 18 seen in FIGURES 2 and 3, the elongated support members 14 are clipped past the furthermost extension of the seal to allow a roll back over the hoops for retention purposes similar to the configurations seen in FIGURES 3 and 6. Later, an elastomeric lug, such as seen at 20, is added to cover the area in which the members 14 link with hoops 18. At this point in the process, another elastomeric member similar to the first can be added to completely encompass the outer periphery of the seal, thereby covering the elongated members 14. It is understood that the ends of the mandrel can be tapered to allow the hoops 18 to more closely approximate the finished inside diameter of the seal.

After the various portions of the seal have been assembled, the assembled seal will then be placed in a compression mold, such as seen in FIGURE 4, where high pressure can be exerted on the assembled seal to cure the elastomer, forcing the various portions of the elastomer into a composite unit, thereby confining the support filaments and hoops, if used. FIGURE 6 illustrates the cured elastomer as a unitary element which is the cross sectional configuration of the cured and finished seal. Thereafter, the seal is removed from the mandrel and is ready for use in the desired installation.

Various steps in the process can be carried out within a desired temperature and pressure range depending on the desired environment of the seal. Also, fewer or more hoops than shown in the drawings can be used if it is important in a given installation to radially restrain the seal. In an installation where great stress of elongation is expected, more elongated supports 14 can be provided. The force of compression and the heat generated thereby can be adjusted to suit the particular elastomer used, the particular elastomer being used being dictated by the operative environment of the seal.

The particular article and method disclosed herein is particularly adaptable for use with rolling diaphragm type seals. It is clear that many other types of seals would be better suited to their environmental use if constructed in the manner disclosed to form the unitary structure taught herein.

While the embodiment of the present invention, as herein disclosed, constitutes a preferred form, it is to be understood that other forms might be adopted.

What is claimed is a follows:

1. A rolling diaphragm seal comprising: a first elastomeric portion of generally cylindrical shape; semi-rigid support means carried longitudinally of the axis of said first elastomeric portion on the exterior thereof, said semi-rigid support means including a series of spaced ribs longitudinally placed on the periphery of said first elastomeric portion with at least one end of said spaced ribs turned back on themselves to receive a rigid support means; said rigid support means being carried circumferentially on a portion of said first elastomeric portion and being interlocked with said semi-rigid support means on an end thereof, said rigid support means including a series of hoop-shaped members circumferentially placed near the ends of said first elastomeric portion and being made integral to a second elastomeric portion by compression; said second elastomeric portion being of generally cylindrical shape fitted around said first elastomeric portion encompassing said semi-rigid and rigid support means, said second elastomeric portion being bonded to said first elastomeric portion during curing of said rolling diaphragm seal.

References Cited

UNITED STATES PATENTS

| | | | |
|---|---|---|---|
| 1,502,372 | 7/1924 | Callanan | 277—116.8 |
| 2,217,986 | 10/1940 | Knox | 277—116.6 |
| 3,104,839 | 9/1963 | Krupp et al. | 138—144 X |
| 3,116,759 | 1/1964 | Webb | 138—125 |
| 695,195 | 3/1902 | Cronwall | 277—208 X |
| 1,400,078 | 12/1921 | Kempton | 138—141 |
| 1,643,119 | 9/1927 | Hartman | 277—235 |
| 1,772,682 | 8/1930 | Phipps | 277—235 X |
| 1,960,120 | 5/1934 | Mohring | 138—141 X |
| 2,143,106 | 1/1939 | Freelander | 277—235 |
| 2,256,701 | 9/1941 | Bacon | 138—141 X |
| 2,277,002 | 3/1942 | MacCalchie | 277—235 X |
| 2,290,935 | 7/1942 | Bacon | 138—141 X |
| 2,305,282 | 12/1942 | Taylor et al. | 277—235 X |
| 2,370,193 | 2/1945 | Reid | 138—141 X |
| 2,308,607 | 1/1943 | Jackson | 138—141 X |
| 2,388,097 | 10/1945 | Turner | 277—237 X |
| 2,527,929 | 10/1950 | Hebard | 277—208 X |
| 2,690,412 | 9/1954 | Nebesar | 138—141 X |
| 2,779,419 | 1/1957 | Mounce | 277—235 X |
| 2,828,823 | 4/1958 | Mounce | 277—235 X |
| 3,002,534 | 10/1961 | Noland | 138—141 |
| 3,028,289 | 4/1962 | Roberts | 138—141 X |
| 3,207,521 | 9/1965 | Dega | 277—208 X |

LAVERNE D. GEIGER, *Primary Examiner.*

N. C. CUDDEBACK, *Assistant Examiner.*